(12) United States Patent
Davis et al.

(10) Patent No.: US 11,785,880 B1
(45) Date of Patent: Oct. 17, 2023

(54) SEED GERMINATION STRIP

(71) Applicants: Jodi Davis, Rogers, OH (US); Terry Ritteger, Rogers, OH (US)

(72) Inventors: Jodi Davis, Rogers, OH (US); Terry Ritteger, Rogers, OH (US)

( * ) Notice: Subject to any disclaimer, the term of this patent is extended or adjusted under 35 U.S.C. 154(b) by 351 days.

(21) Appl. No.: 17/314,180

(22) Filed: May 7, 2021

(51) Int. Cl.
*A01C 1/04* (2006.01)
*H04B 1/02* (2006.01)

(52) U.S. Cl.
CPC ............... *A01C 1/042* (2013.01); *H04B 1/02* (2013.01)

(58) Field of Classification Search
CPC ............ A01C 1/042; A01C 1/044; A01C 1/04
See application file for complete search history.

(56) References Cited

U.S. PATENT DOCUMENTS

| | | | |
|---|---|---|---|
| 150,556 A | 5/1874 | Franklin | |
| 7,614,181 B2 | 11/2009 | Ahm | |
| 9,313,944 B1* | 4/2016 | Faivre | ................... A01M 21/02 |
| 2015/0096265 A1* | 4/2015 | Choe | ................... B29C 37/0067 |
| | | | 53/450 |
| 2021/0368699 A1* | 12/2021 | Richman | ................ A01C 1/044 |

* cited by examiner

*Primary Examiner* — Monica L Perry
(74) *Attorney, Agent, or Firm* — SANCHELIMA & ASSOCIATES, P.A.; Christian Sanchelima; Jesus Sanchelima

(57) ABSTRACT

A seed germination medium includes a roll of matted laminate. The laminate includes at least one biodegradable and water-soluble paper binding layer. Additionally, seeds are disposed on the binding layer, and fertilizer dispersed therein. Furthermore, transmitters may be disposed across the laminate which are in wireless communication with a mobile device having a software application. the transmitter may also include sensors which record information regarding the soil environment of the seed germination medium and transmit that data to the mobile device. As a result, a user is notified of the health of the environment for which the seed germination strip was planted.

10 Claims, 3 Drawing Sheets

SEED GERMINATION STRIP

BACKGROUND OF THE INVENTION

1. Field of the Invention

The present invention relates to a seed germination strip and, more particularly, to a seed germination strip which incorporates garden seeds into a roll of paper to be rolled out for easy and uniform planting.

2. Description of the Related Art

Several designs for a seed germination strip have been designed in the past. None of them, however, include a seed germination medium comprising a roll of matted laminate. The laminate includes at least one biodegradable and water-soluble paper binding layer. Additionally, seeds are disposed on the binding layer, and fertilizer dispersed therein. Furthermore, transmitters may be disposed across the laminate which are in wireless communication with a mobile device having a software application. the transmitter may also include sensors which record information regarding the soil environment of the seed germination medium and transmit that data to the mobile device. As a result, a user is notified of the health of the environment for which the seed germination strip was planted. It is known that gardening is a hobby that may easily become arduous in terms of physical labor. The planting of seeds requires a user to bend down to the soil in order to dig out individual holes to receive a seed therein. The repeated process of bending down and creating holes may prove detrimental to a user's health after repeated practice. Therefore, there is a need for a seed germination medium which provides an easy seed planting solution for individuals who enjoy gardening.

Applicant believes that a related reference corresponds to U.S. patent publication No. 2003/0150556 issued for a fibrous product containing plant seeds. The reference discloses a product that is a laminate having plant seeds and an adhesive intermediate first and second sheet. Applicant believes that another related reference corresponds to U.S. Pat. No. 7,614,181 issued for a seed tape that includes a strip of material that contains evenly spaced seeds along its length. However, the cited references differ from the present invention because they fail to disclose the transmitters mounted to the medium in wireless communication with a mobile device that allows user's to track a seed spacing of the medium. Additionally, the references fail to show a combination of the transmitters and a laminated germinating structure.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a seed germination medium that gives an improved packaging design for garden seeds.

It is another object of this invention to provide a seed germinating medium that eliminates that need to constantly bend during the planting process in a garden.

It is still another object of the present invention to provide a seed germinating medium which enhances the appearance and health of a garden.

It is yet another object of this invention to provide a seed germinating medium which includes transmitters that allows a user to track the health and spacing of their planted seeds.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
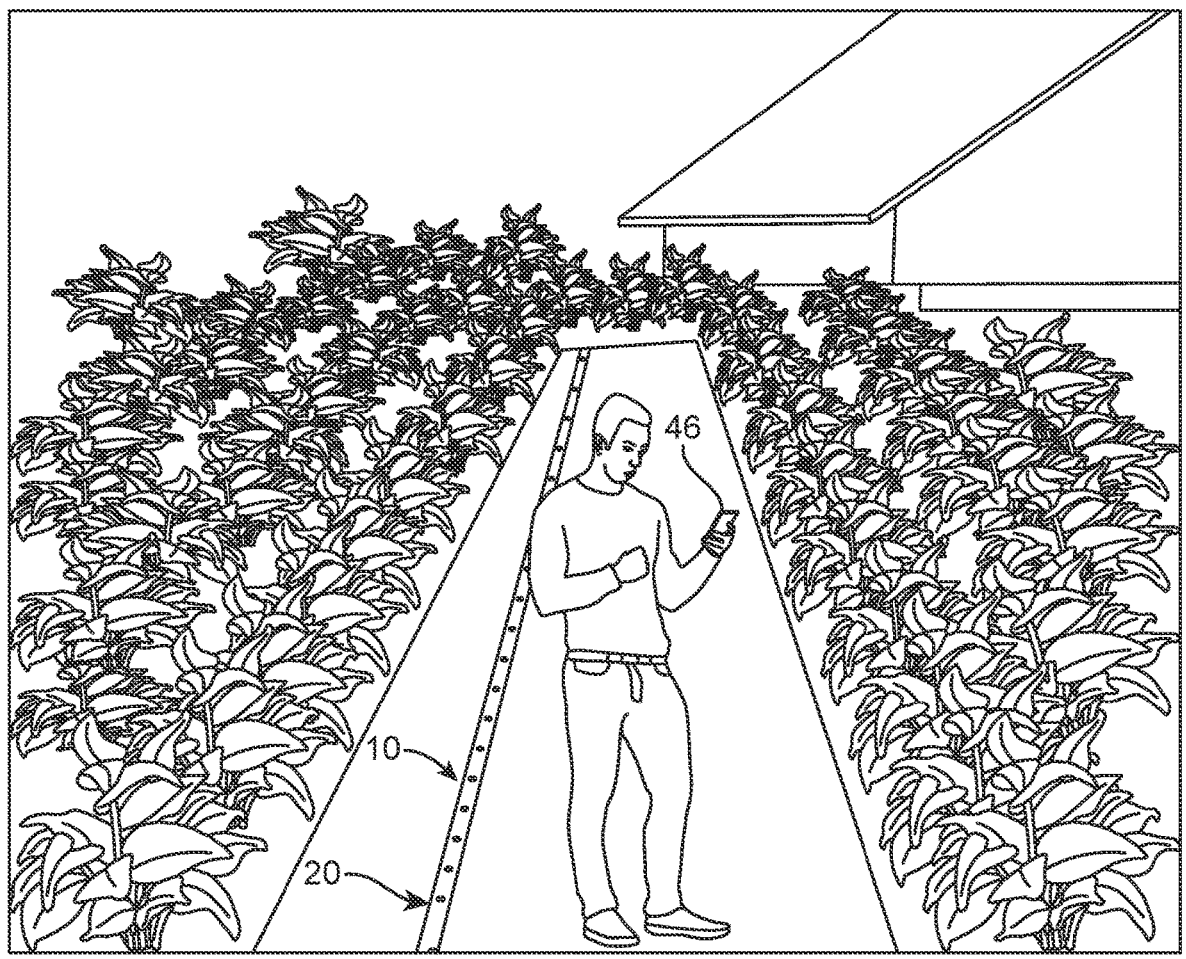
FIG. 1 represents an operational isometric view of seed germinating medium being planted in a soil environment in accordance to an embodiment of the present invention.

Referring now to the drawings, where the present invention is generally referred to with numeral 10, it can be observed a seed germinating medium 10 which basically includes a strip assembly 20 and a communication assembly 40.

Figure 2:
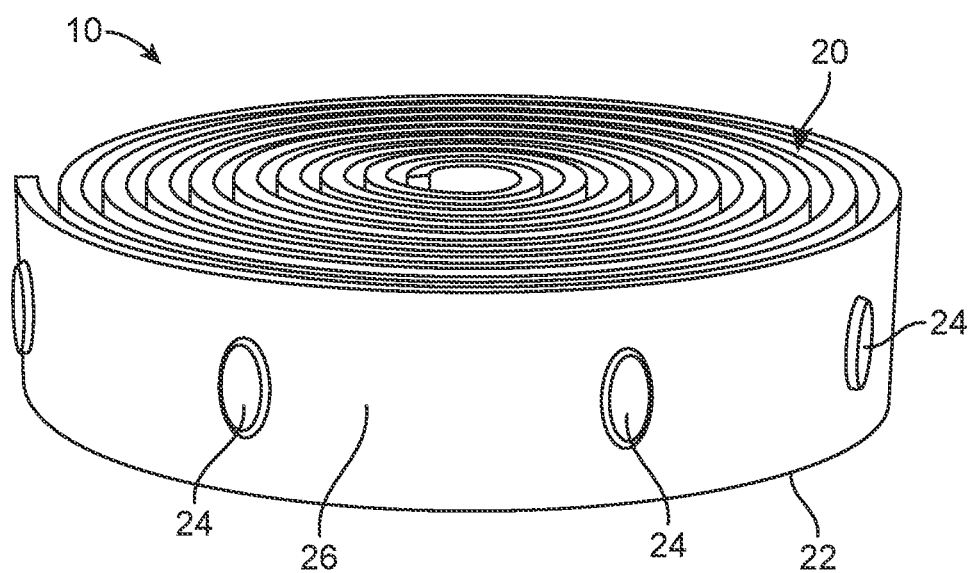
FIG. 2 shows an isometric view of seed germinating medium 10 in a rolled configuration in accordance to an embodiment of the present invention.

Strip assembly 20 includes a strip 22 which may be provided in an elongated rectangular configuration. Additionally, strip 22 may be made of a substantially flexible material allowing strip 22 to be stored in a rolled configuration as depicted in FIG. 2. In one embodiment, strip 22 is made of biodegradable paper material such as hemp and natural biodegradable fibers. Furthermore, strip 22 may be infused with fertilizer or other nutrients and chemicals that will promote seed and plant growth. In the present embodiment, strip 22 is placed in a soil environment as depicted in FIG. 1.

Figure 3:
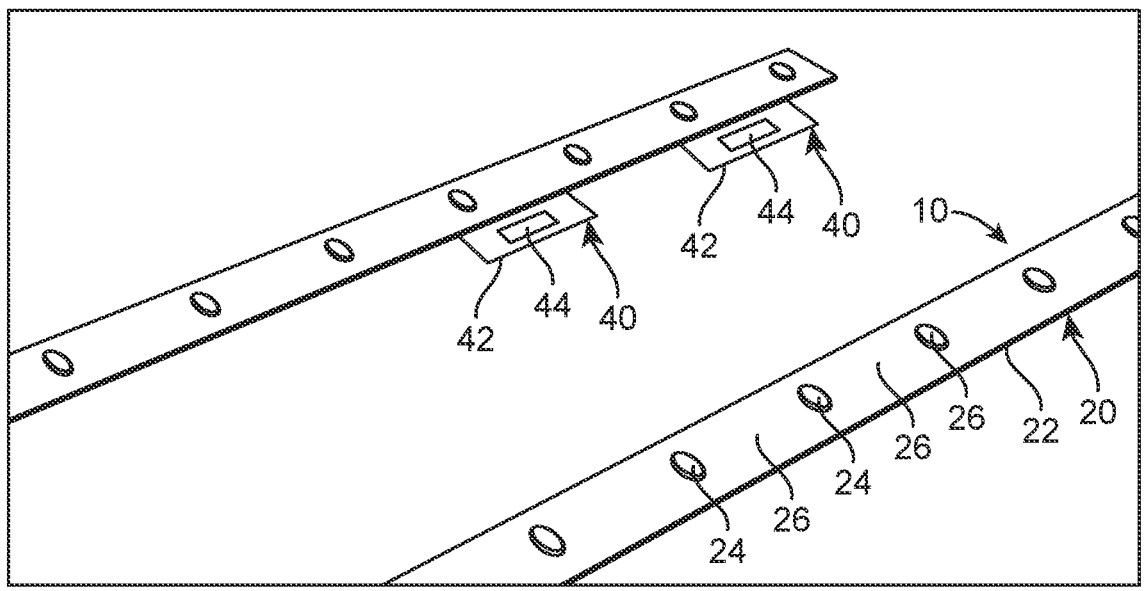
FIG. 3 illustrates shows an isometric view of seed germinating medium 10 in a laid-out configuration in accordance to an embodiment of the present invention.

Strip 22 of strip assembly 20 further includes seeds 24 mounted thereon. In the present embodiment, seeds 24 are provided as plant or vegetable seeds. It should be understood that any type of seed that is usually planted in a soil environment for the purpose of growing fruits, vegetables, or ordinary plants. Seeds 24 are mounted in such a way that a spacing 26 is formed between each seed that is received by strip 22. In one implementation, spacing 26 is provided as equal spacing, providing an equal space between each interval of seeds located on strip 22. Spacing 26 provides the necessary space needed for a seed to develop when planted within the soil environment. If seeds 24 are positioned to closely together, it may result in seeds which may not grow properly which will eventually result in an ugly and uneven garden. Therefore, it is necessary to implement spacing 26 along strip 22 to allow for proper growth of the seeds. Furthermore, different types of seeds may require different lengths of spacing along strip 22. As a result, the distance of spacing 26 is dependent on the type of seed 24 being mounted onto strip 22. As observed in FIG. 3, a single seed 24 is provided in between spacing 26 to provide the appropriate amount of space needed.

Figure 4:
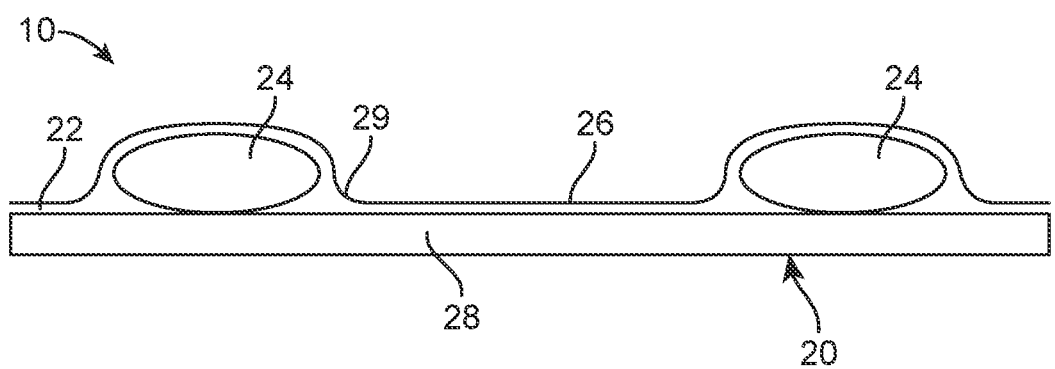
FIG. 4 is a representation of a side view of seed germinating medium 10 depicting various layers of the medium in accordance to an embodiment of the present invention.

Strip 22 of seed assembly 20 further includes a strip layer 28 and a binding layer 29. The strip layer 28 and the binding layer 29 may be properly observed in FIG. 4 provided. Strip layer 28 represents the rectangular strip portion of strip 22 which comes in contact with a top end of a soil environment. Seeds 22 are then mounted directly onto a top end of strip layer 28 and equally spaced. Once seeds 24 are positioned along strip layer 28, binding layer 29 is then placed over strip layer 28 to secure seeds 24 to strip layer 28. In one embodiment, binding layer 29 is provided as laminate material with at least one biodegradable and water-soluble adhesive lined thereon. Binding layer 29 then covers an entire top end of strip layer 28 much like a sheet that covers a bed. Seeds 24 are then nestled in between strip layer 28 and binding layer 29. Since both layers are made of a biodegradable material, strip layer 28 and binding layer 29 will eventually decompose into the soil environment and nourish the seeds 24 that have been mounted onto strip 22.

Communication assembly 40 includes transmitters 42 which are then dispersed along a side edge of strip 22. In one embodiment, transmitters 42 are provided as being removable from strip 22. As a result, a user may disable the function of communication assembly 40 if they wish not to incorporate it into their soil environment. Transmitters 42 are fitted with at least one sensor 44 thereon. In one implementation, sensor 44 is provided as a proximity sensor which measures distance through lasers or ultrasonic waves. The proximity sensor is configured to record the distance provided between seeds 24 and relay the information to a mobile device. Transmitters 42 are in wireless communication with a mobile device 46 having a software application which receives the information being transmitted by transmitters 42. This allows a gardener to keep track to the spacing 26 as the seeds begin to develop and grow into fruits, vegetables, and flowers.

In one embodiment, mobile device 46 may be configured to provide a user with a notification in the event that seeds 24 become too close to each other. The user may then manually fix the spacing in the soil environment to correct the spacing of the seeds. Additionally, sensor 44 is not limited to only being provided as a proximity sensor, other sensors may also be implemented. A temperature sensor may be provided in order to inform a user of the temperature of the soil environment. A user may then take the appropriate measures such as setting up a shade, in order to maintain the soil environment at a proper temperature for seeds 24. In another implementation, sensor 44 is provided as a moisture sensor to measure the amount of moisture within the soil environment. A user may then take the appropriate measures to ensure that the soil environment is maintained at a proper moisture level.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for a seed germinating medium, comprising:
   a) a strip assembly including a strip having seeds mounted to a top end, an equal spacing located in between each of said seeds mounted to said strip, said strip including a strip layer and a binding layer, said seeds securely nestled between said strip layer and said binding layer; and
   b) a communication assembly including at least one transmitter mounted onto said strip, wherein said at least one transmitter includes at least one proximity sensor configured to measure a distance of said equal spacing, wherein said at least one transmitter is in wireless communication with a mobile device.

2. The system for a seed germinating medium of claim 1 wherein said strip has an elongated rectangular shape.

3. The system for a seed germinating medium of claim 1 wherein said strip is stored in a rolled configuration.

4. The system for a seed germinating medium of claim 1 wherein said strip layer is made of a biodegradable fiber.

5. The system for a seed germinating medium of claim 1 wherein said binding layer is a laminate material with a biodegradable and water soluble adhesive lined thereon.

6. The system for a seed germinating medium of claim 5 wherein said binding layers entirely covers a top end of said strip layer.

7. The system for a seed germinating medium of claim 1 wherein said at least one transmitter is located on a side edge of said strip.

8. The system for a seed germinating medium of claim 1 wherein said at least one transmitter includes a temperature sensor configured to record a temperature of a soil environment.

9. The system for a seed germinating medium of claim 1 wherein said at least one transmitter includes a moisture sensor configured to record a moisture level of a soil environment.

10. A system for a seed germinating medium, comprising:
    a) a strip assembly including a strip having an elongated rectangular shape, wherein said strip is made of a flexible material, wherein said strip is stored in a rolled configuration, wherein said strip is made of a biodegradable fiber, wherein said strip further includes seeds mounted to a top end, wherein said seeds are separated by an equal spacing along said strip, wherein said strip further includes a strip layer and a binding layer, wherein said seeds are mounted on said strip layer, wherein said binding layer is a laminate material with a biodegradable and water soluble adhesive lined thereon, wherein said binding layer covers an entire top end of said strip layer, said seeds being nestled in between said strip layer and said binding layer; and
    b) a communication assembly including a plurality of transmitters located along a side edge of said strip, wherein said plurality of transmitters include a plurality of sensors including a proximity sensor, a temperature sensor, and a moisture sensor, wherein said plurality of transmitters are in wireless communication with a mobile device, wherein said mobile device provides a user with a notification in the event of a change of distance of said equal spacing.

* * * * *